(12) United States Patent
Irisawa et al.

(10) Patent No.: US 7,728,299 B2
(45) Date of Patent: Jun. 1, 2010

(54) RADIATION IMAGE DETECTOR

(75) Inventors: Kaku Irisawa, Kanagawa-ken (JP);
Yasuhisa Kaneko, Kanagawa-ken (JP);
Masaharu Ogawa, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 82 days.

(21) Appl. No.: 12/201,781

(22) Filed: Aug. 29, 2008

(65) Prior Publication Data
US 2009/0057563 A1 Mar. 5, 2009

(30) Foreign Application Priority Data
Aug. 31, 2007 (JP) .............................. 2007-226097

(51) Int. Cl.
*A61B 6/00* (2006.01)
(52) U.S. Cl. ............... 250/370.08; 250/582; 250/208.1; 438/694; 313/500; 313/506
(58) Field of Classification Search ............ 250/370.08, 250/582, 208.1; 438/694; 313/500, 506
See application file for complete search history.

(56) References Cited

U.S. PATENT DOCUMENTS

| 5,320,927 | A | * | 6/1994 | Fender et al. ................ 430/128 |
| 5,861,052 | A | * | 1/1999 | Meinander .................... 95/243 |
| 6,171,643 | B1 | * | 1/2001 | Polischuk et al. ............. 427/76 |
| 6,420,251 | B1 | * | 7/2002 | Elmadjian et al. ........... 438/597 |
| 7,564,050 | B2 | * | 7/2009 | Irisawa et al. ................ 250/591 |
| 2001/0025938 | A1 | * | 10/2001 | Imai ........................... 250/591 |
| 2004/0087165 | A1 | * | 5/2004 | Theiss et al. ................. 438/694 |
| 2004/0104362 | A1 | * | 6/2004 | Imai ........................... 250/582 |
| 2005/0248261 | A1 | * | 11/2005 | Hubert et al. ................ 313/500 |
| 2007/0108398 | A1 | * | 5/2007 | Imai ........................... 250/580 |
| 2009/0001254 | A1 | * | 1/2009 | Ogawa et al. ............ 250/208.1 |

FOREIGN PATENT DOCUMENTS

JP 2002329848 A * 11/2002
JP 2006-156555 A 6/2006

* cited by examiner

*Primary Examiner*—David P Porta
*Assistant Examiner*—Djura Malevic
(74) *Attorney, Agent, or Firm*—Sughrue Mion, PLLC

(57) ABSTRACT

Edge portions of detection electrodes, such as a first linear electrode and a second linear electrode, that include the side surfaces of the detection electrodes and parts of surfaces of the detection electrodes, the surfaces continuing from the side surfaces and facing a photoconductive layer for recording, are covered with dielectrics. Further, surfaces of the detection electrodes and the dielectrics are coated with an anti-crystallization layer to prevent crystallization of a photoconductive layer for readout. At this time, the surfaces of the electrodes are smoothly covered with the dielectrics at angles θ of contact of 5 to 60 degrees so that no bump is present, thereby preventing generation of a crack in the anti-crystallization layer on the dielectrics and the electrodes. Accordingly, crystallization of the photoconductive layer for readout, which is induced by injection of charges from the edge portions of the detection electrodes or the like, is prevented.

4 Claims, 6 Drawing Sheets

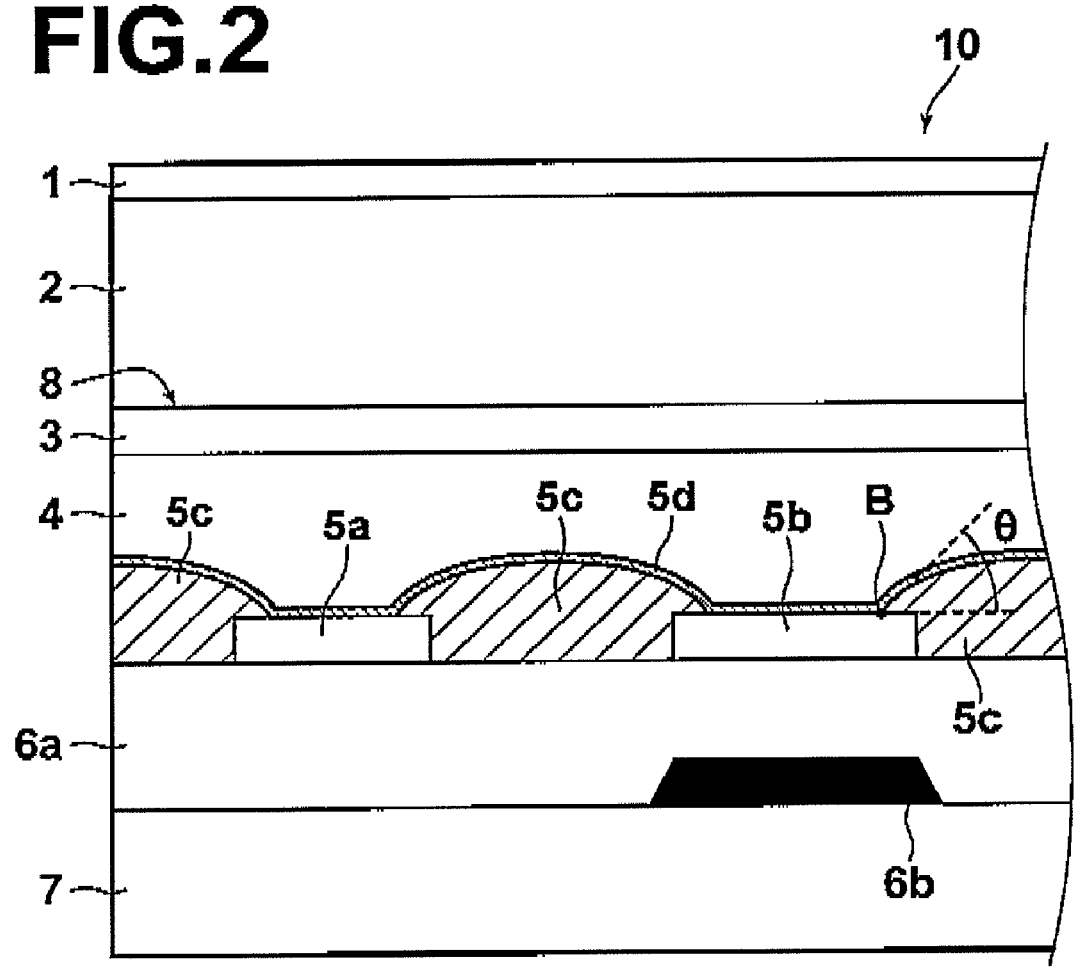

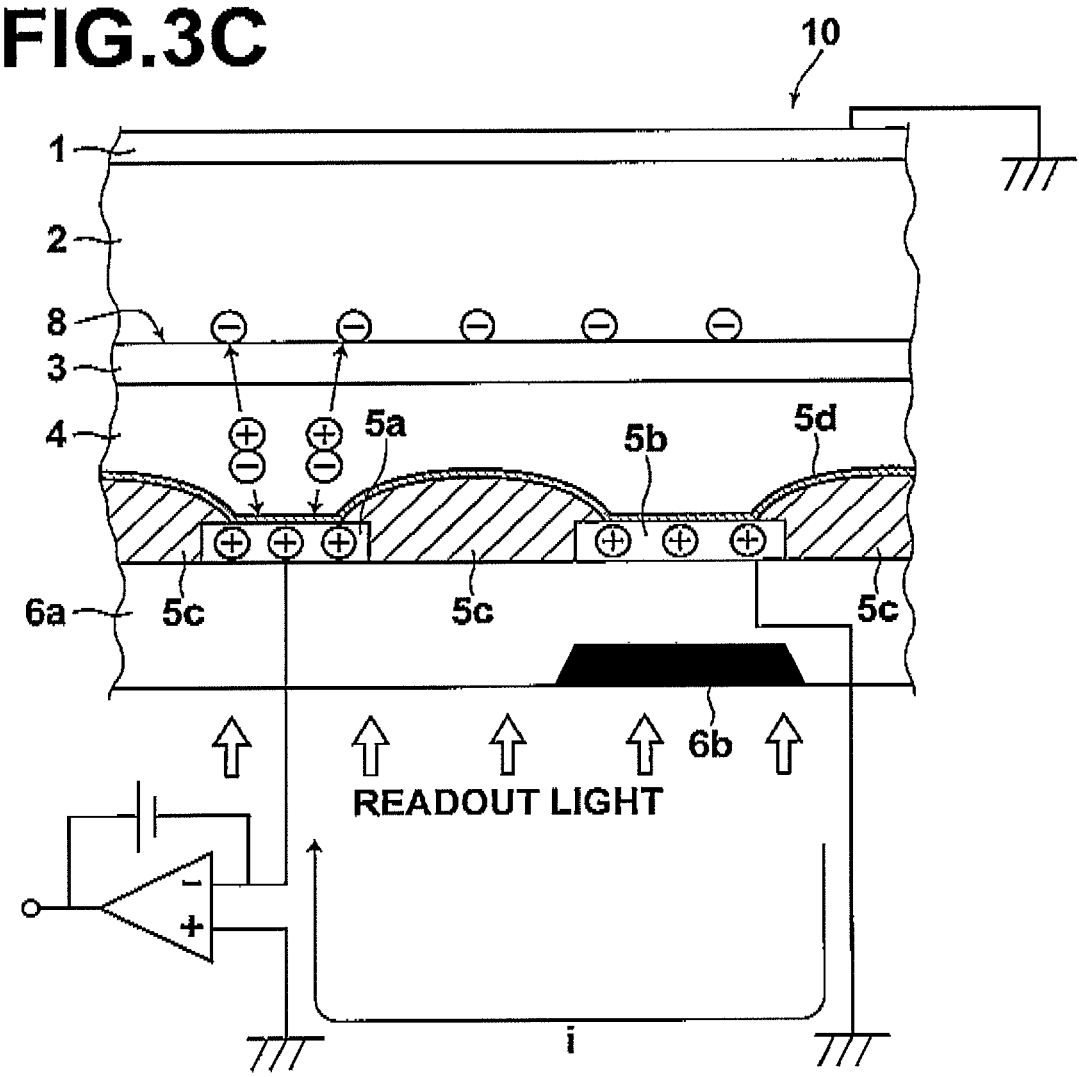

FIG.4

| | EDGE COVER (DIELECTRIC) | ANTI-CRYSTALLIZATION LAYER | ELECTRICAL PROPERTIES | CRYSTALLIZATION |
|---|---|---|---|---|
| 1: (COMPARATIVE EXAMPLE 1) | PRESENT | ABSENT | ○ | △ |
| 2: (COMPARATIVE EXAMPLE 2) | ABSENT | PRESENT | △ | △ |
| 3: (EXAMPLE 1) | PRESENT | PRESENT | △ | ○ |
| 4: (EXAMPLE 2) | PRESENT | PRESENT (As CONCENTRATION CHANGES) | ○ | ○ |

RADIATION IMAGE DETECTOR

BACKGROUND OF THE INVENTION

1. Field of the Invention

The present invention relates to a radiation image detector for recording radiation images by generating charges by irradiation with radiation and by storing the charges.

2. Description of the Related Art

Conventionally, in the medical field or the like, various kinds of radiation image detectors that record radiation images related to a subject have been proposed and used in practical situations. The radiation image detectors record the radiation images related to the subject by irradiation with radiation that has passed through the subject and output electric signals based on the recorded radiation images.

The radiation image detectors are classified into a direct-conversion type and an indirect-conversion type. In the direct-conversion type, radiation is directly converted into charges and the charges are stored (accumulated). In contrast, in the indirect-conversion type, radiation is temporarily converted into light by using a scintillator, such as CsI:Tl and GOS ($Gd_2O_2S$:Tb), and the light is converted into charges in the photoconductive layer. Then, the charges are stored. Further, the readout types of the radiation image detectors are basically classified into a light readout type using readout light and an electrical readout type using a thin film transistor (TFT).

As the light-readout-type radiation image detector, the following radiation image detector is known, for example. In the light-readout-type radiation image detector, charges generated in a photoconductive layer for recording by irradiation with radiation are stored and linear electrodes are charged (electrified) with charges that have the opposite polarity to the polarity of the stored charges. Pairs of charges (charge pairs, dipoles or the like) are generated in the photoconductive layer for readout by irradiation with readout light and the charges of the pairs of charges that have two different polarities are combined with the stored charges and the charges that have charged the linear electrodes, respectively. Accordingly, the stored charges are read out.

As the electrical-readout-type radiation image detector, the following radiation image detector is known, for example. In the electrical-readout-type radiation image detector, charges generated by irradiation with radiation are collected by pixel electrodes for respective pixels and stored in a storage capacity (accumulation capacity) connected to the pixel electrodes. Then, the stored charges are read out, pixel by pixel, by turning on/off electrical switches, such as thin film transistors (TFT's), a charge coupled device (CCD), or a complementary metal oxide semiconductor (CMOS) sensor.

A technique of covering the entire surfaces of pixel electrodes with an insulation coating or a coating made of an insulating substance containing carbon particles or metal particles in an electrical-readout-type radiation image detector is disclosed in Japanese Unexamined Patent Publication No. 2006-156555. In the technique, the pixel electrodes are covered in such a manner to make the surface of the coating smooth (even) and to improve the properties of the coating.

Further, U.S. Pat. No. 5,861,052 discloses a technique of providing a semiconductor that separately covers each of edge portions of the pixel electrodes in an electrical-readout-type radiation image detector. The semiconductor is provided to prevent charges that have once trapped by the pixel electrodes from moving to other pixels electrodes adjacent thereto.

The aforementioned linear electrodes and pixel electrodes are detection electrodes for detecting signals based on charges generated by irradiation with radiation. In such detection electrodes, an electric field tends to concentrate in the edge portions thereof. Therefore, charges tend to be injected into the photoconductive layer from the edge portions of the detection electrodes. As the material for the photoconductive layer, an amorphous (non-crystalline) substance, such as amorphous selenium, is generally used. If excessive charges are injected into the photoconductive layer from the edge portions of the detection electrodes, heat is generated at the portion of the photoconductive layer into which the charges have been injected. Consequently, crystallization occurs in the photoconductive layer. If crystallization occurs in the photoconductive layer, an artifact is generated in a detected image because the electrical property of the crystallized portion and that of the amorphous portion differ from each other. Consequently, the image quality deteriorates.

Such injection of charges can be effectively prevented by covering the pixel electrodes with an insulating substance. Japanese Unexamined Patent Publication No. 2006-156555 discloses structure in which pixel electrodes are covered with an insulation coating. However, the entire surfaces of the pixel electrodes that include not only the edge portions of the pixel electrodes but flat portions of the pixel electrodes are covered. Therefore, the charge transfer characteristic becomes lower and the sensitivity and the residual image characteristic (afterimage characteristic) deteriorate. Japanese Unexamined Patent Publication No. 2006-156555 discloses a technique of covering the entire surfaces of the pixel electrodes with a coating containing particles that have a charge transfer characteristic to improve electrical conductivity. However, in this structure, charges tend to be injected into the photoconductive layer Consequently, crystallization of the photoconductive layer tends to occur.

U.S. Pat. No. 5,861,052 discloses structure in which the edge portions of the pixel electrodes are covered with a semiconductor. The electrical conductivity of the semiconductor is high. Therefore, the sensitivity and the residual image characteristic do not deteriorate, but the amount of charges injected into the photoconductive layer increases. Therefore, the structure is not effective to prevent crystallization of the photoconductive layer.

Further, even if injection of excessive charges into the photoconductive layer is reduced, there is a problem that crystallization of the photoconductive layer occurs and progresses by using the radiation image detector repeatedly.

SUMMARY OF THE INVENTION

In view of the foregoing circumstances, it is an object of the present invention to provide a radiation image detector that can prevent crystallization of a photoconductive layer that is caused by injection of charges from the edge portions of detection electrodes or the like.

A radiation image detector of the present invention is a radiation image detector comprising:

a photoconductive layer that generates charges by irradiation with an electromagnetic wave; and a plurality of detection electrodes for detecting signals corresponding to the charges generated in the photoconductive layer, wherein the photoconductive layer and the plurality of detection electrodes are deposited one on the other in this order, the radiation image detector further comprising:

dielectrics that cover edge portions of the detection electrodes, the edge portions including the side surfaces of the detection electrodes and parts of surfaces of the detection electrodes, the surfaces continuing from the side surfaces and facing the photoconductive layer; and an anti-crystallization layer for preventing crystallization of the photoconductive layer, the anti-crystallization layer coats the dielectrics and the detection electrodes, wherein the angles of contact between the surfaces of the detection electrodes, the surfaces facing the photoconductive layer, and the dielectrics are greater than or equal to 5 degrees and less than or equal to 60 degrees.

The aforementioned term "radiation image detector" refers to a detector that outputs image signals representing a radiation image related to a subject by detecting recording light (light for recording or electromagnetic waves, such as radiation, for example) that carries image information about the subject. The radiation image detector directly converts radiation that has entered the detector into charges. Alternatively, the radiation image detector first converts radiation that has entered the detector into light and converts the light into charges. Then, the radiation image detector outputs the charges to the outside of the detector. Accordingly, image signals representing a radiation image related the subject can be obtained.

As such a radiation image detector, various types of radiation image detectors have been provided. For example, if the radiation image detectors are classified based on their charge generation processes for converting radiation into charges, there are a light-conversion-type radiation image detector, a direct-conversion-type radiation image detector and the like. The light-conversion-type radiation image detector detects fluorescence output from a phosphor by irradiation with radiation and obtains signal charges at a photoelectric conversion device. Then, the signal charges are converted into image signals (electric signals) and output. The direct-conversion-type radiation image detector converts signal charges that have been generated in a radiation conductor by irradiation with radiation into electric signals and output the electric signals. Further, if the radiation image detectors are classified based on their charge readout processes for reading out charges to the outside of the detectors, there are an electric-readout-type radiation image detector/a light-readout-type radiation image detector and the like. In the electric-readout-type radiation image detector, a TFT (thin film transistor) connected to a charge storage portion is scan-driven and charges are read out. In the light-readout-type radiation image detector, the detector is irradiated with readout light (light for readout or electromagnetic waves, such as radiation) and charges are read out. Further, there are an improved direct-conversion-type radiation image detector, which is a combination of the direct-conversion type and the light-readout type, and the like.

Further, the photoconductive layer and the detection electrodes are deposited one on another within a predetermined deposition area. Therefore, the present invention intends to provide the dielectrics and the anti-crystallization layer for each of detection electrodes within the deposition area. In other words, it is not necessary to provide the dielectrics and the anti-crystallization layer for detection electrodes that are not in the deposition area.

Further, the phrase "the edge portions including the side surfaces of the detection electrodes and parts of surfaces of the detection electrodes, the surfaces continuing from the side surfaces and facing the photoconductive layer" refers to the side surfaces of the detection electrodes and peripheral portions of surfaces of the electrodes, the surfaces continuing from the side surfaces and facing the photoconductive layer.

Further, it is desirable that the photoconductive layer is made of a material that contains a-Se as a main component and that the anti-crystallization layer is made of a material that contains Se—As alloy as a main component.

Further, the phrase "contains . . . as a main component" refers to a condition that the component is contained at the highest weight percent among all the components of each layer.

Further, it is desirable that the As concentration of the anti-crystallization layer is greater than or equal to 5% and less than or equal to 15%.

Further, it is more desirable that the As concentration of the anti-crystallization layer at the interface thereof with the detection electrodes is greater than or equal to 5% and less than or equal to 15% and that the As concentration of the anti-crystallization layer becomes lower toward the photoconductive layer side of the anti-crystallization layer with respect to the direction of deposition of the photoconductive layer and the plurality of detection electrodes.

In the radiation image detector of the present invention, the edge portions of the detection electrodes are covered with dielectrics. Since the dielectric has an insulation characteristic and achieves an effect of moderating the intensity of an electric field by dielectric polarization, it is possible to reduce injection of charges from the edge portions of the detection electrodes. Therefore, it is possible to prevent crystallization of the photoconductive layer that is caused by injection of charges. Further, since the anti-crystallization layer is provided on the dielectrics and the detection electrodes, even if crystallization occurs, it is possible to suppress development of crystallization. In the radiation image detector of the present invention, it is possible to definitely prevent crystallization of the photoconductive layer because of the functions of the dielectrics and the anti-crystallization layer.

If the thickness of the anti-crystallization that contains an additive for preventing crystallization of the photoconductive layer is too thick, the electrical properties, such as the sensitivity and the residual image, of the detector deteriorate. Therefore, it is desirable that the thickness of the anti-crystallization layer is as thin as possible. However, if the thickness of the anti-crystallization layer is thin, there is a risk that a crack is generated in the anti-crystallization at a bump (uneven portion), such as the edge portion of the detection electrode, for example.

However, in the radiation image detector of the present invention, the angles of contact between the surfaces of the detection electrodes, the surfaces facing the photoconductive layer, and the dielectrics are greater than or equal to 5 degrees and less than or equal to 60 degrees. Therefore, the surface of the dielectrics and the detection electrodes forms a smooth shape. Since the anti-crystallization layer is formed on the smooth shape, even if the thickness of the anti-crystallization layer is thin, it is possible to prevent generation of a crack in the anti-crystallization layer. Accordingly, it is possible to improve the anti-crystallization performance of the anti-crystallization layer with respect to the photoconductive layer without degrading the electrical properties of the radiation image detector.

BRIEF DESCRIPTION OF THE DRAWINGS

FIG. 2 is a sectional view of the radiation image detector at line II-II of FIG. 1;

FIG. 3C is a diagram for explaining an operation for reading out a radiation image from the radiation image detector illustrated in FIG. 1;

FIG. 4 is a table showing comparison between examples of a radiation image detector of the present invention and comparative examples.

DESCRIPTION OF THE PREFERRED EMBODIMENTS

Figure 1:
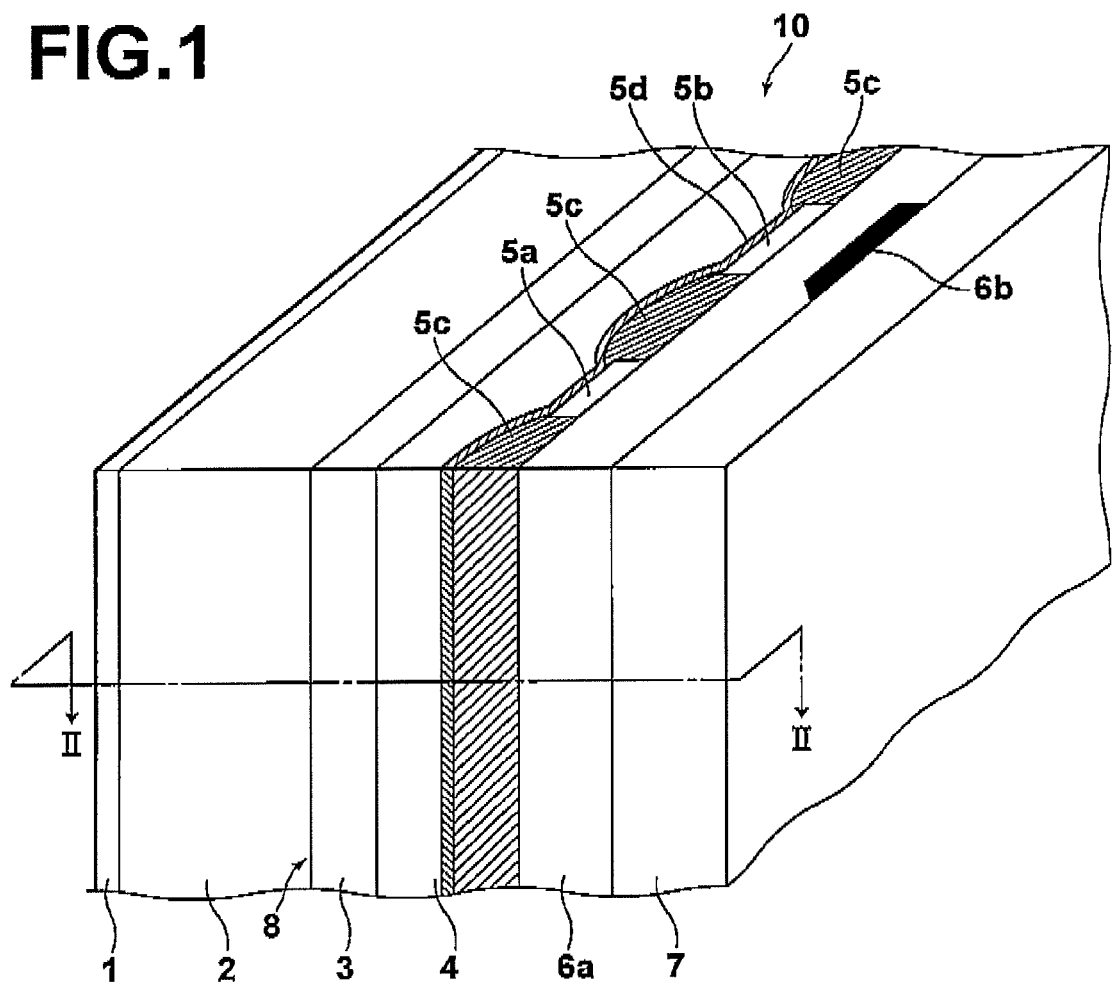
FIG. 1 is a schematic diagram illustrating the structure of a radiation image detector according to a first embodiment of the present invention.

Hereinafter, a first embodiment of a radiation image detector according to the present invention will be described with reference to drawings. FIG. 1 is a perspective view of the radiation image detector according to the first embodiment of the present invention. FIG. 2 is a sectional view of the radiation image detector illustrated in FIG. 1 at line II-II of FIG. 1. In FIGS. 1 and 2, the structure of each layer is schematically illustrated. Therefore, in FIGS. 1 and 2, the thickness and the width of each layer are not accurately illustrated.

A radiation image detector 10 of the present invention is a light-readout-type radiation image detector. The radiation image detector 10 includes a first electrode layer 1, a photoconductive layer 2 for recording, a charge transfer layer 3, a photoconductive layer 4 for readout, a second electrode layer, a transparent insulating layer 6a and a support member 7, which are superposed one on another in this order. The first electrode layer 1 transmits electromagnetic waves for recording, such as X-rays, that have passed through a subject, and which carries image information. The photoconductive layer 2 for recording generates pairs of charges by irradiation with the electromagnetic waves for recording that have passed through the first electrode layer 1 and exhibits electrical conductivity. The charge transfer layer 3 acts as an insulator with respect to charges (storage charges) of the charges that have been generated in the photoconductive layer 2 for recording, the storage charges being stored (accumulated) at the time of recording the image information. Further, the charge transfer layer 3 acts as a conductor with respect to transfer charges that have an opposite polarity to that of the storage charges. The photoconductive layer 4 for readout generates charges by irradiation with readout light. The second electrode layer includes a plurality of first linear electrodes 5a and a plurality of second linear electrodes 5b, which are detection electrodes for detecting signals corresponding to the charges generated in the photoconductive layer 2 for recording. The transparent insulating layer 6a has an insulating characteristic and transmits the readout light. The support member 7 transmits the readout light.

Further, a charge storage portion (charge accumulation portion) 8 is formed at the interface between the photoconductive layer 2 for recording and the charge transfer layer 3. The charge storage portion 8 is two-dimensionally distributed and stores the storage charges that carry a radiation image, and which have been generated in the photoconductive layer 2 for recording. Each of the aforementioned layers is sequentially formed on the support member 7, such as a glass substrate, that transmits the readout light, the second transparent insulating layer 6a being closest to the support member 7.

Further, the characteristic structure of the radiation image detector 10 of the present invention is that dielectrics 5c are provided at the edge portions of the first linear electrodes 5a and at the edge portions of the second linear electrodes 5b and that an anti-crystallization layer 5d is provided to cover the surface of the first linear electrodes 5a, the second linear electrodes 5b and the dielectrics 5c. The structure of the dielectrics and the anti-crystallization will be described later in detail.

The size (area) of the radiation image detector 10 is greater than or equal to 18×18 cm, for example. Especially, when the radiation image detector 10 is used for chest X-ray radiography, the effective size should be approximately 43×43 cm.

The first electrode layer 1 should transmit radiation. Optionally, a metal thin film may be used as the first electrode layer 1, for example. The material of the first electrode layer 1 may be metal, such as Au, Ni, Cr, Pt, Ti, Al, Cu, Pd, Ag, Mg, 3 to 20% alloy of MgAg, a Mg—Ag-based intermetallic compound, 3 to 20% alloy of MgCu and a Mg—Cu-based intermetallic compound.

As the material for the first electrode layer 1, Au, Pt and a Mg—Ag-based intermetallic compound are desirable. For example, when Au is used as the material for the first electrode layer 1, it is desirable that the thickness of the layer is greater than or equal to 15 nm and less than or equal to 200 nm. Optionally, the thickness of the layer may be greater than or equal to 30 nm and less than or equal to 100 nm. Alternatively, for example, when 3 to 20% alloy of MgAg is used, it is desirable that the thickness of the layer is greater than or equal to 100 nm and less than or equal to 400 nm. The first electrode layer 1 may be formed by using an arbitrary method, such as a vapor deposition method using resistance heating evaporation.

The photoconductive layer 2 for recording is made of a photoconductive material that generates charges by irradiation with radiation. The photoconductive layer 2 for recording may be made of an amorphous selenium compound or a compound containing, as a main component, at least one of $Bi_2MO_{20}$ (M: Ti, Si, Ge), $Bi_4M_3O_{12}$ (M: Ti, Si, Ge), $Bi_2O_3$, $BiMO_4$ (M: Nb, Ta, V), $Bi_2WO_6$, $Bi_{24}B_2O_{39}$, ZnO, ZnS, ZnSe, ZnTe, $MNbO_3$ (M: Li, Na, K), PbO, $HgI_2$, $PbI_2$, CdS, CdSe, CdTe, $BiI_3$, GaAs and the like. It is desirable that the photoconductive layer 2 for recording is made of the amorphous selenium compound, because the amorphous selenium compound has relatively high quantum efficiency with respect to radiation and high dark resistance and the like among the aforementioned compounds.

When the amorphous selenium compound is used as the material for the photoconductive layer 2 for recording, the photoconductive layer 2 for recording may be doped with a minute amount of alkali metal, such as Li, Na, K, Cs and Rb, at a concentration between 0.001 ppm and 1 ppm. Alternatively, the photoconductive layer 2 for recording may be doped with a minute amount of fluoride, such as LiF, NaF, KF, CsF and RbF, at a concentration between 0.1 ppm and 1000 ppm. Alternatively, the photoconductive layer 2 for recording may be doped with P, As, Sb or Ge at a concentration between 50 ppm and 0.5% or with As at a concentration between 10 ppm and 0.5%. Alternatively, the photoconductive layer 2 for recording may be doped with a minute amount of Cl, Br or I at a concentration between 1 ppm and 100 ppm. Especially, it is desirable to use amorphous selenium containing As approximately at 10 ppm to 200 ppm, amorphous selenium containing As approximately at 0.2% to 1% and further containing Cl at 5 ppm to 100 ppm, or amorphous selenium containing As approximately at 0.2% to 1% and further containing alkali metal approximately at 0.001 ppm to 1 ppm.

Further, as the material of the photoconductive layer 2 for recording, a material containing micro-particles of a photoconductive substance, such as $Bi_2MO_{20}$ (M: Ti, Si, Ge), $Bi_4M_3O_{12}$ (M: Ti, Si, Ge), $Bi_2O_3$, $BiMO_4$ (M: Nb, Ta, V), $Bi_2WO_6$, $Bi_{24}B_2O_{39}$, ZnO, ZnS, ZnSe, ZnTe, $MNbO_3$ (M: Li, Na, K), PbO, $HgI_2$, $PbI_2$, CdS, CdSe, CdTe, $BiI_3$ and GaAs, the sizes of which are a few nm to a few μm, may be used.

When the amorphous selenium compound is used as the material of the photoconductive layer 2 for recording, it is desirable that the thickness of the photoconductive layer 2 for recording is greater than or equal to 100 μm and less than or equal to 2000 μm. Especially, when the radiation image detector is used for mammography, it is desirable that the thickness of the layer is greater than or equal to 150 μm and less than or equal to 250 μm. When the radiation image detector is used for general radiography, it is desirable that the thickness of the layer is greater than or equal to 500 μm and less than or equal to 1200 μm.

The charge transfer layer 3 should have an insulating characteristic with respect to charges to be stored and conductivity with respect to charges having the opposite polarity to the polarity of the charges to be stored. It is desirable that the product of the mobility and the lifetime of charges of one polarity differs from that of the other polarity by at least three digits. As the material of the charge transfer layer 3, the following materials may be used; a polymer, such as acrylic-based organic resin, polyimide, BCB, PVA, acrylic, polyethylene, polycarbonate and polyetherimide; sulfide, such as $As_2S_3$, $Sb_2S_3$ and ZnS; oxides and fluorides. Examples of desirable compounds are as follows: $AS_2Se_3$, $As_2Se_3$ doped with Cl, Br or I at 500 ppm to 20000 ppm, $As_2(Se_xTe_{1-x})_3$ (0.5<x<1), in which Se of $As_2Se_3$ is replaced with Te approximately at 50%, $As_2Se_3$, the As concentration of which has been changed approximately by ±15%, and amorphous Se—Te-based compound containing Te at 5 to 30 wt %.

When the aforementioned substances containing chalcogenide-based elements are used, it is desirable that the thickness of the charge transfer layer 3 is greater than or equal to 0.4 μm and less than or equal to 3.0 μm. Optionally, the thickness may be greater than or equal to 0.5 μm and less than or equal to 2.0 μm. The charge transfer layer 3 may be formed by one deposition process. Alternatively, the charge transfer layer 3 may be formed by performing a plurality of times of deposition.

As a desirable charge transfer layer 3 using an organic coating, a compound obtained by doping a polymer, such as acrylic-based organic resin, polyimide, BCB, PVA, acrylic, polyethylene, polycarbonate and polyetherimide, with charge transfer material may be used. Examples of desirable charge transfer material are molecules selected from the group consisting of tris(8-quinolinolato) aluminum (Alq3), N,N'-diphenyl-N,N'-di(m-tolyl)benzine (TPD), poly(p-phenylenevinylene) (PPV), poly(alkyl thiophene), poly(vinyl carbazole) (PVK), triphenylene (TNF), metal phthalocyanine, 4-dicyanomethylene-2-methyl-6-(p-dimethylaminostyryl)-4H-pyran (DCM), liquid crystal molecules, hexapentyloxytriphenylene, discotic liquid crystal molecules, the center cores of which contain n-conjugated condensed rings or transition metal, carbon nanotube, and fullerene. The doping amount may be set in a range between 0.1 and 50 wt %.

As the photoconductive layer 4 for readout, a photoconductive material that generates charges by irradiation with readout light may be used. As the material of the photoconductive layer 4 for readout, an amorphous selenium compound and a semiconductor material, such as amorphous Si:H, the energy gap of which is within the range of 0.7 to 2.5 eV, may be used. Especially, it is desirable that the amorphous selenium is used as the material of the photoconductive layer 4 for readout.

When the amorphous selenium is used as the material of the photoconductive layer 4 for readout, the photoconductive layer 4 for readout may be doped with a minute amount of alkali metal, such as Li, Na, K, Cs and Rb, at a concentration between 0.001 ppm and 1 ppm. Alternatively, the photoconductive layer 4 for readout may be doped with a minute amount of fluoride, such as LiF, NaF, KF, CsF and RbF, at a concentration between 10 ppm and 10000 ppm. Alternatively, the photoconductive layer 4 for readout may be doped with P, As, Sb or Ge at a concentration between 50 ppm and 0.5% or with As at a concentration between 10 ppm and 0.5%. Alternatively, the photoconductive layer 4 for readout may be doped with a minute amount of Cl, Br or I at a concentration between 1 ppm and 100 ppm. Especially, it is desirable to use amorphous selenium containing As approximately at 10 ppm to 200 ppm, amorphous selenium containing As approximately at 0.2% to 1% and further containing Cl at 5 ppm to 100 ppm, or amorphous selenium containing As approximately at 0.2% to 1% and further containing alkali metal approximately at 0.001 ppm to 1 ppm.

The thickness of the photoconductive layer 4 for readout should be sufficient to absorb the readout light. Further, the thickness of the photoconductive layer 4 for readout should be sufficient to allow the charges that have been generated in the photoconductive layer 4 for readout by irradiation with readout light to drift by an electric field of charges stored in the charge storage portion 8. It is desirable that the thickness is approximately in the range of 1 μm to 30 μm.

The first linear electrodes 5a and the second linear electrodes 5b are alternately arranged in such a manner that they are substantially parallel to each other with a predetermined distance therebetween. The first linear electrodes 5a and the second linear electrodes 5b are cyclically arranged. In FIG. 1, the longitudinal direction of the first linear electrodes 5a and that of the second linear electrode 5b are the vertical direction of FIG. 1. The second linear electrodes 5b are shielded from readout light by a color filter layer 6b, which will be described later. The second linear electrodes 5b are electrodes for non-generating charge pairs by light, in contrast to the first linear electrodes 5a, which are electrodes for generating charge pairs by light. Specifically, charge pairs for reading out signals are not generated in the photoconductive layer 4 for readout, which corresponds to the second linear electrodes 5b. Here, in the second electrode layer, the linear electrodes are used so as to make it possible to easily correct structure noise, to improve the S/N ratio of images by reducing capacity, to reduce readout time by performing parallel readout (mainly, in the main scan direction) and the like.

The first linear electrodes 5a and the second linear electrodes 5b may be made of any kind of material that transmits readout light and that has electrical conductivity. It is necessary that the first linear electrodes 5a and the second linear electrodes 5b are flat (even) so that fractures thereof by concentration of electric fields at the time of high voltage application are prevented. For example, the first linear electrodes 5a and the second linear electrodes 5b may be formed of ITO, IZO or the like with a thickness of 0.1 to 1 μm. Alternatively, the first linear electrodes 5a and the second linear electrodes 5b may be made of metal, such as Al and Cr, with a thickness (for example, approximately 10 nm) that is appropriate to transmit the readout light.

The first linear electrodes 5a and the second linear electrodes 5b extend to the outside of the deposition area of the layers and connect to a wire substrate (substrate) for detecting signals. The first linear electrodes 5a are used as signal lines. The second linear electrodes 5b are shared (combined) on the outside of the deposition area. For example, the width of the first linear electrode 5a and that of the second linear electrode 5b may be 10 μm and 20 μm, respectively. Further, a distance between the first linear electrode 5a and the second linear electrode 5b may be 10 μm. In other words, pairs of the first linear electrode 5a and the second linear electrode 5b may be arranged at a pitch of 50 μm.

The dielectrics 5c are provided along the longitudinal directions of the first linear electrodes 5a and the second linear electrodes 5b at the edge portions thereof. The edge portions include the side surfaces of the first linear electrodes 5a and the second linear electrodes 5b and parts of surfaces of the first linear electrodes 5a and the second linear electrodes 5b, the surfaces continuing from the side surfaces and facing the photoconductive layer for recording, as illustrated in FIGS. 1 and 2. Since the edge portions, at which electric fields tend to concentrate, are covered with the dielectrics 5c, it is possible to reduce injection of charges from the edge portions, thereby preventing image defects.

The material of the dielectric 5c should have an insulating characteristic. The material may either transmit or block the readout light. For example, novolac resin, acrylic resin, PVA (polyvinylalcohol) coating, PVP (polyvinyl pyrrolidone) coating, PAA (polyacrylic acid) coating or the like may be used. Further, the thickness of the dielectric 5c may be in the range of 0.05 μm to 5 μm. It is desirable that the dielectric 5c is sufficiently thick to prevent injection of charges.

Further, another structural characteristic of the radiation image detector 10 is that the anti-crystallization layer 5d is provided, as illustrated in FIGS. 1 and 2. The anti-crystallization layer 5d covers the surfaces of the first linear electrodes 5a, the second linear electrodes 5b and the dielectrics 5c. The anti-crystallization layer 5d is provided to prevent crystallization of the photoconductive layer 4 for readout. The anti-crystallization layer 5d can prevent deterioration in the characteristic of the radiation image detector 10 even if the radiation image detector 10 is used repeatedly.

As the material of the anti-crystallization layer 5d, a material obtained by adding As to amorphous selenium at 5% to 15%, a material obtained by adding S, Te, P, Sb or Ge to amorphous selenium at 1% to 10% and a material obtained by adding a combination of at least one of the aforementioned elements and a different element to amorphous selenium are desirable to prevent crystallization. Optionally, a material, such as $As_2S_3$ and $As_2Se_3$, that has high crystallization temperature may be used. Further, in addition to the elements to be added, it is desirable that the anti-crystallization layer 5d is doped with alkali metal, such as Li, Na, K, Rb and Cs, or molecules of LiF, NaF, KF, RbF, CsF, LiCl, NaCl, KCl, CsCl, CsBr or the like at 10 ppm to 5000 ppm to prevent injection of charges, particularly holes, from the electrode layer. It is desirable that the anti-crystallization layer 5d is doped with a halogen element, such as Cl, I and Br, or molecules of $In_2O_3$ or the like at 10 ppm to 5000 ppm to prevent injection of electrons.

If the thickness of the anti-crystallization layer 5d is too thin, the aforementioned purposes are not sufficiently achieved. Further, if the thickness of the anti-crystallization layer 5d is too thick, the electrical properties of the detector, such as the sensitivity and the residual image, deteriorate. Therefore, it is desirable that the thickness of the anti-crystallization layer 5d is in the range of 0.05 μm to 1.5 μm. When the thickness of the anti-crystallization layer 5d is measured, the interface between the anti-crystallization layer 5d and the photoconductive layer may be determined in the following manner. A position at which the As concentration of the anti-crystallization layer, which becomes lower toward the photoconductive layer, reaches 5% of the maximum concentration may be determined as the interface.

If the thickness of the anti-crystallization layer 5d is thin, a crack is easily generated. Therefore, an angle θ formed by the interface between the surface of the first linear electrode 5a, the surface facing the photoconductive layer 4 for readout, and the dielectric 5c and the interface between the anti-crystallization layer 5d and the dielectric 5c should be greater than or equal to 5 degrees and less than or equal to 60 degrees. Hereinafter, the angle θ is referred to as an angle θ of contact (contact angle θ). When the contact angle θ is considered, in the sectional view illustrated in FIG. 2, the two interfaces should be approximated to straight lines and an angle formed by the two approximate straight lines is used as the contact angle θ. However, if it is difficult to approximate the interfaces to straight lines, a tangential line of the dielectric 5c at contact point B between the first linear electrode 5a and the dielectric 5c may be used instead of the approximate straight line. The contact angle θ has been described with respect to the dielectric 5c provided on the first linear electrode 5a. The contact angle with respect to the dielectric 5c provided on the second linear electrode 5b may be considered in a similar manner.

As illustrated in FIG. 2, the dielectric 5c, which covers the edge portion of the electrode, smoothly covers the surface of the electrode at the aforementioned contact angle θ in such a manner that no bump is present. Therefore, it is possible to prevent generation of a crack in the anti-crystallization layer 5d, which is formed on the surface of the electrode and the dielectric 5c. Therefore, the advantageous effect of the anti-crystallization layer 5d is stably obtained. If the contact angle θ is less than 5 degrees, it becomes difficult to produce the dielectric 5c in the aforementioned manner. Further, if the contact angle θ exceeds 60 degrees, the anti-crystallization layer 5d easily cracks and that is not desirable.

The transparent insulating layer 6a has an insulating characteristic and transmits readout light. As the material of the transparent insulating layer 6a, acrylic resin may be used, for example. Further, it is desirable that the thickness of the transparent insulating layer 6a is approximately less than or equal to 1 μm.

Further, a color filter layer 6b is provided at a portion corresponding to the second linear electrode 5b with the transparent insulating layer 6a therebetween. The color filter layer 6b blocks the readout light. As the material of the color filter layer 6b, a metal material, such as Al, Mo and Cr, an inorganic material, such as $MoS_2$, $WSi_2$ and TiN, or the like may be used. Alternatively, a pigment may be dispersed in an organic material, such as acrylic resin, and the obtained material may be used as the material for the color filter layer 6b. The width of the color filter layer 6b may be 30 μm, for example.

The color filter layer 6b can block entrance of the readout light to the second linear electrode 5b. Therefore, it is possible to prevent generation of charge pairs for extracting signals in the photoconductive layer 4 for readout that corresponds to the second liner electrode 5b.

As the support member 7, a material that is transparent to the readout light should be used. For example, a glass substrate or a substrate made of an organic polymer material may be used.

Next, an example of the operation by the radiation image detector 10 will be described. In the following example of the operation, the first electrode layer 1 is charged with negative charges and the second electrode layer is charged with positive charges. Further, the charge storage portion 8, which is formed at the interface between the photoconductive layer 2 for recording and the charge transfer layer 3, accumulates negative charges as storage charges. Further, the charge transfer layer 3 functions as a so-called hole transfer layer, in which the mobility of positive charges as transfer charges is higher than that of negative charges as storage charges. Further, the anti-crystallization layer 5d has electrical conductivity with respect to negative charges and an insulating characteristic with respect to positive charges. However, each of the aforementioned charges may have an opposite polarity. When the polarities are reversed, it is sufficient to slightly modify the radiation image detector 10, for example, by changing the charge transfer layer that functions as the hole transfer layer to an electron transfer layer and the like.

First, negative bias voltage is applied to the first electrode layer 1 of the radiation image detector 10 by a high-voltage power source and an electric field is formed between the first electrode layer 1 and the second electrode layer. When the electric field is formed, the first linear electrodes 5a and the second linear electrodes 5b in the second electrode layer are charged with positive charges. In this state, radiation is output from a radiation source, such as an X-ray source, toward a subject. The radiation passes through the subject and the radiation that carries image information about the subject irradiates the radiation image detector 10 from the first electrode layer 1 side.

The radiation that has irradiated the radiation image detector 10 passes through the first electrode layer 1 and irradiates the photoconductive layer 2 for recording. Accordingly, charge pairs, which include positive charges and negative charges, are generated in the photoconductive layer 2 for recording (please refer to FIG. 3A). The positive charges (holes) of the charge pairs move toward the first electrode layer 1 and combine with the negative charges in the first electrode layer 1 and disappear. The negative charges in the first electrode layer 1 have been induced by the high-voltage power source. Meanwhile, the negative charges (electrons) of the charge pairs move toward the second electrode layer along electric field distribution formed by application of the voltage. Then, the negative charges are accumulated, as storage charges, at the charge storage portion 8, which is the interface between the photoconductive layer 2 for recording and the charge transfer layer 3 (please refer to FIG. 3B). The amount of the storage charges is substantially proportionate to the irradiation dose of radiation. The amount of the storage charges represents a radiation image.

Here, when the electric field has been formed, if the edge portions of the first electrode 5a and the edge portion of the second electrode 5b in the second electrode layer are not covered with the dielectrics 5c, electric fields concentrate at the edge portions and injection of charges occurs. However, in the radiation image detector 10 of the present embodiment, it is possible to reduce injection of charges from the edge portions, because the dielectrics 5c are provided at the edge portions. Further, it is possible to suppress generation of image defects.

When the radiation image that has been recorded in the radiation image detector 10, as described above, is read out, the radiation image detector 10 is irradiated with readout light from the support member 7 side while the first electrode layer 1 is grounded. When irradiation with the readout light is performed, linear readout light extending in a direction perpendicular to the longitudinal direction of the second electrode layer is moved in the longitudinal direction of the second electrode layer and the entire surface (area) of the radiation image detector 10 is scanned. Accordingly, charge pairs of positive and negative charges are generated in the photoconductive layer 4 for readout that corresponds to the scan position with the readout light (please refer to FIG. 3C). Charge pairs are not generated at portions of the photoconductive layer 4 for readout, the portions corresponding to the second linear electrodes 5b, which are shielded from light by the color filter layer 6b.

Figure 3A:
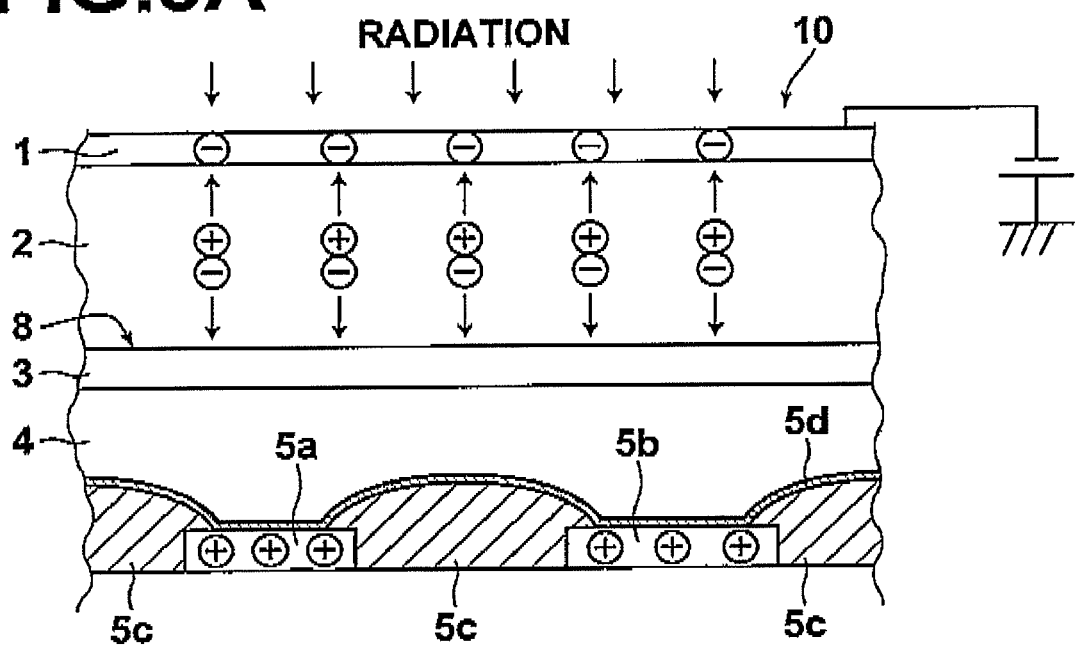
FIG. 3A is a diagram for explaining an operation for recording a radiation image in the radiation image detector illustrated in FIG. 1.
Figure 3B:
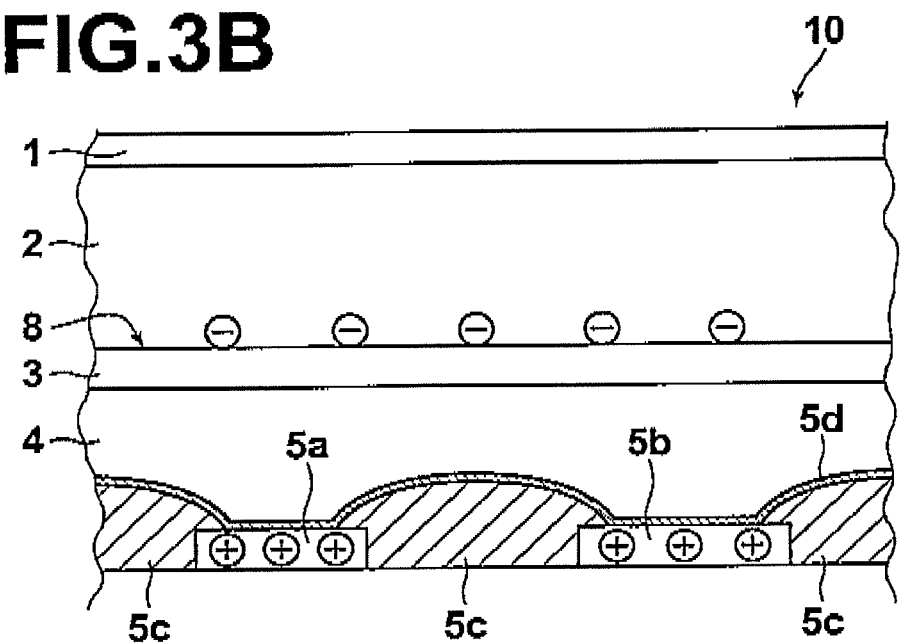
FIG. 3B is a diagram for explaining an operation for recording a radiation image in the radiation image detector illustrated in FIG. 1.

In FIGS. 3A and 3B, the transparent insulating layer 6a, the color filter layer 6b and the support member 7 are omitted. In FIG. 3C, the support member 7 is omitted. In FIG. 3C, the readout light should be output from a position below the support member 7.

The positive charges of the charge pairs move toward the storage charges at the charge storage portion 8 and combine with the storage charges and disappear. Meanwhile, the negative charges of the charge pairs move toward the positive charges charged in the first linear electrodes 5a of the second electrode layer and combine with the positive charges and disappear.

Then, electric current i flows into an electric current detection amplifier as the negative charges and the positive charges combine with each other as described above. The electric current is integrated and detected as image signals and the image signals corresponding to the radiation image are read out.

In the aforementioned embodiment, an example, in which the radiation image detector 10 includes the first linear electrodes 5a for generating charge pairs by light and the second linear electrodes 5b for non-generating charge pairs by light and the dielectrics 5c and the anti-crystallization layer 5d are provided for both of the first linear electrodes 5a and the second linear electrodes 5b, was described. However, when two kinds of electrodes are present, the dielectrics 5c and the anti-crystallization layer 5d may be provided for only one of the two kinds of electrodes. Even if the dielectrics 5c and the anti-crystallization layer 5d are provided in such a manner, it is possible to reduce image defects and to improve the sensitivity and the residual image characteristic, compared with a radiation image detector in which neither dielectric nor anti-crystallization layer is provided.

Next, examples of the radiation image detector of the present invention and comparative examples will be described. FIG. 4 is a table showing comparison between the examples of the present invention and the comparative examples. In all of the examples and the comparative examples, amorphous selenium is used as the material of the photoconductive layer. Further, as the anti-crystallization layer, Se—As alloy is used. In the anti-crystallization layer, if the As concentration in amorphous selenium is too low, the effect of preventing crystallization of the photoconductive layer is low. If the As concentration is too high, the electrical properties of the image detector deteriorate. Therefore, it is desirable that the As concentration in amorphous selenium of the anti-crystallization layer is 5 to 15%.

In Comparative Example 1, edge portions of linear electrodes were covered with dielectrics, but no anti-crystallization layer was provided. In this case, the electrical properties, such as the sensitivity and the residual image, were efficient. However, after the image detector was used repeatedly, crystallization of the photoconductive layer developed.

In Comparative Example 2, edge portions of linear electrodes were not covered with dielectrics, but an anti-crystallization layer was provided. As the anti-crystallization layer, a material obtained by adding As to amorphous selenium at 10% was used. In this case, the electrical properties, such as the sensitivity and the residual image, were not very efficient. Further, after the image detector was used repeatedly, crystallization of the photoconductive layer developed.

In Example 1, both of dielectrics and an anti-crystallization layer were provided. As the anti-crystallization layer, a material obtained by adding As to amorphous selenium at 10% was used. In this case, the electrical properties, such as the sensitivity and the residual image, were not very efficient. However, even if the image detector was used repeatedly, crystallization of the photoconductive layer was not substantially observed.

In Example 2, both of dielectrics and an anti-crystallization layer were provided in a manner similar to Example 1. As the anti-crystallization layer, a layer obtained by co-evaporating (co-vapor-depositing) Se and $As_2Se_3$ was used. Further, the layer was formed in such a manner that the As concentration in the vicinity of the interface of the linear electrodes is 10%, the As concentration becomes lower toward the photoconductive layer side and the As concentration becomes 1% or less in the vicinity of the thickness of 0.25 μm. In this case, the electrical properties, such as the sensitivity and the residual image, were efficient. Further, even if the image detector was used repeatedly, crystallization of the photoconductive layer was not substantially observed.

As the results of the examples and the comparative examples show, if only one of the dielectrics and the anti-crystallization layer is provided, crystallization of the photoconductive layer is not prevented in a sufficient manner. The results show that it is necessary to provide both of the dielectrics and the anti-crystallization layer, as in the present embodiment, to prevent crystallization of the photoconductive layer.

Figure 5:
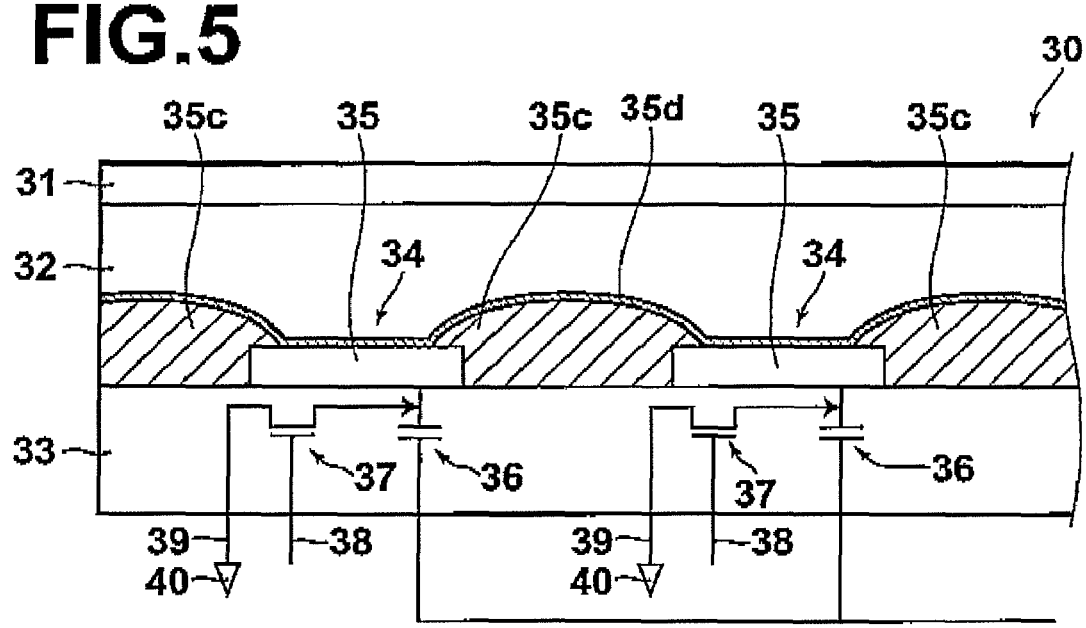
FIG. 5 is a schematic diagram illustrating a radiation image detector according to a second embodiment of the present invention.

Next, a second embodiment of the radiation image detector of the present invention will be described. FIG. 5 is a schematic diagram illustrating the configuration of a radiation image detector 30 according to the second embodiment of the present invention.

The radiation image detector 30 of the present embodiment is an electrical-readout-type detector. As illustrated in FIG. 5, the radiation image detector 30 includes an electrode layer 31, a photoconductive layer 32 and a plurality of pixel electrodes 35, which are deposited one on another in this order. The electrode layer 31 transmits electromagnetic waves for recording that carry image information. The photoconductive layer 32 generates charges by irradiation with the electromagnetic waves for recording that have passed through the electrode layer 31. The plurality of pixel electrodes 35 are detection electrodes for detecting signals corresponding to the charges generated in the photoconductive layer 32. Each of the pixel electrodes 35 is connected to a storage capacity 36 for accumulating charges collected by the pixel electrode 35 and to a switch device 37. The pixel electrode 35, the storage capacity 36 and the switch device 37 constitute a pixel portion 34. A multiplicity of pixel portions 34 are two-dimensionally arranged to form a charge detection layer 33.

The electrode layer 31 is made of a low-resistance electrically-conductive material such as Au. Further, a high-voltage source (not illustrated) for applying bias voltage is connected to the electrode layer 31.

The photoconductive layer 32 conducts electromagnetic waves. Further, charges are generated in the photoconductive layer 32 by irradiation with radiation. As the photoconductive layer 32, amorphous coating of a-Se that contains selenium as a main component with a thickness of 100 to 1000 μm may be used, for example.

The charge detection layer 33 is formed by an active matrix substrate. The pixel portion 34 includes a multiplicity of scan lines 38 and a multiplicity of data lines 39 in addition to the pixel electrode 35 and the like. The multiplicity of scan lines 38 are used for ON/OFF of the switch device 37. The multiplicity of data lines 39 are used to read out charges accumulated in the storage capacity 36.

The pixel electrode 35 collects signal charges corresponding to the charges generated in the photoconductive layer 32. The pixel electrode 35 may be made of a material, such as Al, Au, Cr, ITO (Indium Tin Oxide) and IZO (Indium Zinc Oxide). It is desirable that the thickness of the pixel electrode 35 is 0.05 μm to 1 μm.

In the radiation image detector 30 of the present embodiment, dielectrics 35c and an anti-crystallization layer 35d are provided between the pixel electrodes 35 and the photoconductive layer 32, as characteristic elements of the detector.

The dielectrics 35c cover the edge portions of the pixel electrodes 35. Here, the term "edge portions" refers to portions including the side surfaces of the pixel electrodes 35 and parts of surfaces of the pixel electrodes 35, the surfaces continuing from the side surfaces and facing the photoconductive layer 32. Since the dielectrics 35c are provided at the edge portions, at which an electric field tends to concentrate, it is possible to reduce injection of charges from the edge portions. Consequently, it is possible to suppress generation of image defects.

The material of the dielectrics 35 should have an insulating characteristic. A material similar to the material of the dielectric 5c of the first embodiment may be used.

In the second embodiment, a contact angle similar to the contact angle θ of the dielectric 5c in the first embodiment, illustrated in FIG. 2, may be considered. It is desirable that the contact angle is greater than or equal to 5 degrees and less than or equal to 60 degrees. If the contact angle is less than 5 degrees, it becomes difficult to produce the dielectric 35c in the aforementioned manner. Further, if the contact angle exceeds 60 degrees, the anti-crystallization layer 35d on the dielectrics 35c easily cracks and that is not desirable.

The anti-crystallization layer 35d in the present embodiment is provided in such a manner that the surfaces of the pixel electrodes 35 and the dielectrics 35c are coated with the anti-crystallization layer 35d. The anti-crystallization layer 35d is provided to prevent crystallization of the photoconductive layer 32. Even if the radiation image detector 30 is used repeatedly, it is possible to prevent deterioration in the properties of the radiation image detector 30.

As the anti-crystallization layer 35d, a material similar to the material of the anti-crystallization layer 5d in the first embodiment may be used.

Next, an example of the operation of the radiation image detector 30 will be described. First, negative bias voltage is applied to the electrode layer 31 of the radiation image detector 30 by a high-voltage source (power source). Consequently, an electric field is generated between the electrode layer 31 and the pixel electrodes 35. In this state, a subject is irradiated with radiation from a radiation source, such as an X-ray source. The radiation passes through the subject and the radiation image detector 30 is irradiated with radiation that carries image information about the subject from the electrode layer 31 side.

The radiation with which the radiation image detector has been irradiated passes through the electrode layer 31 and the photoconductive layer 32 is irradiated with the radiation. Accordingly, charge pairs including positive charges and negative charges are generated in the photoconductive layer 32. The positive charges (holes) of the charge pairs move toward the electrode layer 31 and combine with the negative charges in the electrode layer 31 induced by the hiqh-voltage source and disappear.

Meanwhile, the negative charges (electrons) of the charge pairs move toward the pixel electrode 35 along electric field distribution formed by application of the voltage. Then, the negative charges are accumulated, as storage charges, at the storage capacity 36, which is electrically connected to the pixel electrode 35. Since the photoconductive layer 32 generates charges corresponding to the irradiation dose of radiation, charges corresponding to image information carried by the radiation are accumulated in the storage capacity 36 of each of the pixel portions 34.

Here, when an electric field is formed, if the edge portions of the pixel electrode 35 are not covered with the dielectrics 35c, the electric field concentrates at the edge portions and injection of charges occurs. However, in the image detection detector 30 of the present embodiment, in which the dielectrics 35c are provided, it is possible to reduce injection of charges from the edge portions. Therefore, it is possible to suppress generation of image defects.

When a radiation image that has been recorded as described is read out, signals for turning on the switch devices 37 are sequentially output through scan lines 38 and charges accumulated in each of the storage capacities 36 are obtained (extracted). Further, the charge amount of each pixel is detected by an amplifier 40. Accordingly, image information can be read out.

The present invention is not limited to the aforementioned embodiments. Various modifications may be made without deviating from the scope of the invention. For example, in the light-readout-type radiation image detector in the first embodiment, the second linear electrode 5b may be made of a light-shielding substance instead of providing the color filter layer 6b. Further, in the light-readout-type radiation image detector, all of the linear electrodes may be electrodes for generating charges. Further, voltage having an opposite polarity may be applied at the time of driving.

What is claimed is:

1. A radiation image detector comprising:
    a photoconductive layer that generates charges by irradiation with an electromagnetic wave; and
    a plurality of detection electrodes for detecting signals corresponding to the charges generated in the photoconductive layer, wherein the photoconductive layer and the plurality of detection electrodes are deposited one on the other in this order, the radiation image detector further comprising:
    dielectrics that cover edge portions of the detection electrodes, the edge portions including the side surfaces of the detection electrodes and parts of surfaces of the detection electrodes, the surfaces continuing from the side surfaces and facing the photoconductive layer; and
    an anti-crystallization layer for preventing crystallization of the photoconductive layer, the anti-crystallization layer coats the dielectrics and the detection electrodes, wherein the angles of contact between the surfaces of the detection electrodes, the surfaces facing the photoconductive layer, and the dielectrics are greater than or equal to 5 degrees and less than or equal to 60 degrees.

2. A radiation image detector, as defined in claim 1, wherein the photoconductive layer is made of a material that contains a-Se as a main component, and wherein the anti-crystallization layer is made of a material that contains Se—As alloy as a main component.

3. A radiation image detector, as defined in claim 2, wherein the As concentration of the anti-crystallization layer is greater than or equal to 5% and less than or equal to 15%.

4. A radiation image detector, as defined in claim 2, wherein the As concentration of the anti-crystallization layer at the interface thereof with the detection electrodes is greater than or equal to 5% and less than or equal to 15%, and wherein the As concentration of the anti-crystallization layer becomes lower toward the photoconductive layer side of the anti-crystallization layer with respect to the direction of deposition of the photoconductive layer and the plurality of detection electrodes.

* * * * *